United States Patent
Ahn et al.

(10) Patent No.: US 7,414,609 B2
(45) Date of Patent: Aug. 19, 2008

(54) METHOD OF DRIVING LAMP AND DRIVING CIRCUIT THEREFOR

(75) Inventors: Byeong-Hyeon Ahn, Gumi-si (KR);
Sang-Gyu Kim, Gumi-si (KR);
Seung-Hoon Yang, Dae-gu (KR);
Won-Young Sun, Jeollanam-do (KR);
Hong-Youl Lim, Masan-si (KR)

(73) Assignee: LG Display Co., Ltd., Seoul (KR)

( * ) Notice: Subject to any disclaimer, the term of this patent is extended or adjusted under 35 U.S.C. 154(b) by 707 days.

(21) Appl. No.: 11/022,834

(22) Filed: Dec. 28, 2004

(65) Prior Publication Data

US 2005/0231131 A1   Oct. 20, 2005

(30) Foreign Application Priority Data

Apr. 20, 2004   (KR) .................. 10-2004-0027031

(51) Int. Cl.
*G09G 3/36* (2006.01)
(52) U.S. Cl. ..................................... 345/102; 345/87
(58) Field of Classification Search ............. 345/76–77, 345/82–84, 45, 87–92, 96, 102, 46–47, 209, 345/214, 207, 690
See application file for complete search history.

(56) References Cited

U.S. PATENT DOCUMENTS

| 5,481,163 | A | 1/1996 | Nakamura et al. |
| 5,574,338 | A | 11/1996 | Kuusisto et al. |
| 6,127,785 | A * | 10/2000 | Williams ................ 315/224 |
| 6,388,388 | B1 | 5/2002 | Weindorf et al. |
| 6,486,618 | B1 | 11/2002 | Li |
| 6,580,230 | B2 | 6/2003 | Koncz et al. |
| 6,646,391 | B2 * | 11/2003 | Okamoto et al. ........... 315/246 |
| 6,690,121 | B1 | 2/2004 | Weindorf |
| 6,693,396 | B1 | 2/2004 | Hsu |
| 2003/0020412 | A1 | 1/2003 | Luerkens et al. |
| 2003/0169226 | A1 * | 9/2003 | Yamada ..................... 345/102 |
| 2003/0210221 | A1 * | 11/2003 | Aleksic ..................... 345/102 |
| 2004/0017163 | A1 | 1/2004 | Hsu |
| 2004/0056609 | A1 | 3/2004 | Jang |

(Continued)

FOREIGN PATENT DOCUMENTS

EP   1 235 468 A2   8/2002

(Continued)

*Primary Examiner*—Richard Hjerpe
*Assistant Examiner*—Mansour M Said
(74) *Attorney, Agent, or Firm*—McKenna Long & Aldridge LLP

(57) ABSTRACT

A method of driving a lamp includes receiving a source power output from a power source; generating a first control signal; adjusting at least one attribute of the received source power based on the first control signal to generate a first lamp-driving power, the first lamp-driving power inducing a first tube current having a first tube current value within the lamp; after generating the first control signal, generating a second control signal, different from the first control signal; and adjusting at least one attribute of the received source power based on the second control signal to generate a second lamp-driving power, the second lamp-driving power inducing a second tube current having a second tube current value within the lamp, wherein the second tube current value is different from the first tube current value.

20 Claims, 3 Drawing Sheets

U.S. PATENT DOCUMENTS

2004/0125071 A1* 7/2004 Kim et al. .................. 345/102
2006/0164377 A1* 7/2006 Struebel et al. ............. 345/102

FOREIGN PATENT DOCUMENTS

| | | |
|---|---|---|
| GB | 2 314 176 A | 12/1997 |
| JP | 07-211468 | 8/1995 |
| JP | 2000-287035 | 10/2000 |
| WO | WO 2004/030420 A1 | 8/2004 |

* cited by examiner

| Input time | Tube current control signal |
|---|---|
| ⋮ | ⋮ |
| ⋮ | ⋮ |
| $t_j \leq t < t_i$ | $OP_j$ |
| ⋮ | ⋮ |
| ⋮ | ⋮ |
| $t_c \leq t$ | $OP_c$ |

Lookup table

METHOD OF DRIVING LAMP AND DRIVING CIRCUIT THEREFOR

This application claims the benefit of Korean Patent Application No. 2004-0027031, filed on Apr. 20, 2004, which is hereby incorporated by reference for all purposes as if fully set forth herein.

BACKGROUND OF THE INVENTION

1. Field of the Invention

The present invention relates to liquid crystal display (LCD) devices. More particularly, the present invention relates to a driving circuit of a backlight unit used in liquid crystal display (LCD) devices and a driving method using the same.

2. Discussion of the Related Art

Liquid crystal display (LCD) devices are advantageously light-weight, dimensionally compact, and consume a relatively low amount of power during operation. Consequently, LCD devices are widely used as displays in office automation and audio/video equipment.

Generally, LCD devices include an image display unit, e.g., LCD panel having a plurality of pixels arranged in a matrix pattern. When image signals are applied to the plurality of pixels, an orientation of liquid crystal molecules contained within the LCD device is altered. When the orientation of liquid crystal molecules is altered, the light transmittance characteristics of the plurality of pixels are manipulated and an image is displayed.

By themselves, LCD panels do not emit light. Therefore, a light source (e.g., a cold cathode fluorescent lamp or a light-emitting diode) must be used to express images formed at the LCD panel. Due to their low heat emission, high brightness, long life span, and full color display capabilities, cold cathode fluorescent lamps are widely used and preferred over light-emitting diodes as light sources suitable for use within LCD devices.

FIG. 1 illustrates a schematic view of an LCD device including a related art lamp-driving circuit.

Referring to FIG. 1, a lamp 130 emits light to an image display unit 140. The emitted light is then selectively transmitted by the image display unit 140 and an image is thus expressed. The lamp 130 emits light when AC power P is output from an inverter unit 120. The AC power P induces a tube current IL to flow within the lamp 130 and aid in the emission of light. Generally, the inverter unit 120 outputs the AC power P by boosting a low voltage direct current (DC) power output from a power source unit 110 into high voltage AC power P. Accordingly, the inverter unit 120 typically includes a switching element and a transformer.

FIG. 2 illustrates tube current and brightness of light emitted by a lamp versus time in the related art lamp-driving circuit.

Referring to FIG. 2, the tube current IL quickly increases as an input time, t, progresses until, at the end of a first time period t1, the tube current IL is saturated and maintained at a value of IL1 (i.e., 6 mA). While the brightness of light emitted by the lamp 130 is affected by the tube current IL, the brightness of light emitted by the lamp 130 slowly increases as the input time, t, progresses. Consequently, the brightness of light emitted by the lamp 130 increases after the tube current IL is saturated and maintained at the value of IL1 until, at the end of a second time period t2 (typically about five minutes), the brightness of light emitted by the lamp reaches an acceptable value, Y.

Because the related art lamp 130 attains the acceptable brightness value Y only after power P has been applied to the lamp 130 until the end of the second time period, t2, the quality with which images are displayed by the image display unit 140 is unsatisfactory until the end of the second time period, t2.

SUMMARY OF THE INVENTION

Accordingly, the present invention is directed to a backlight unit driving circuit for a liquid crystal display (LCD) device and a driving method using the same that substantially obviates one or more of the problems due to limitations and disadvantages of the related art.

An advantage of the present invention provides a backlight unit driving circuit of a LCD device and a driving method using the same that improves the quality of images expressed by an LCD panel.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a method of driving a lamp may, for example, include generating receiving a source power output from a power source; generating a first control signal; adjusting at least one attribute of the received source power based on the first control signal to generate a first lamp-driving power, the first lamp-driving power inducing a first tube current having a first tube current value within the lamp; after generating the first control signal, generating a second control signal, different from the first control signal; and adjusting at least one attribute of the received source power based on the second control signal to generate a second lamp-driving power, the second lamp-driving power inducing, a second tube current having a second tube current value within the lamp, wherein the second tube current value is different from the first tube current value.

According to principles of the present invention, a liquid crystal display device may, for example, include an image display unit; a lamp that emits light to the image display unit; a power source unit that provides power to the lamp; an inverter unit connected to an output of the power source unit and the lamp, the inverter unit altering power output by the power source unit and outputting the altered power to the lamp; and an inverter-controlling unit connected to the inverter unit, the inverter-controlling unit generates a reference signal controlling the altering operation of the inverter unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
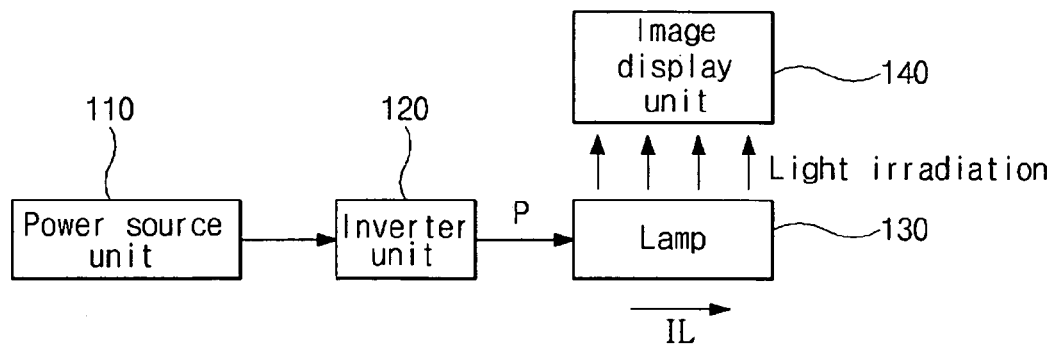
FIG. 1 illustrates a schematic view of an LCD device including a related art lamp-driving circuit.
Figure 2:
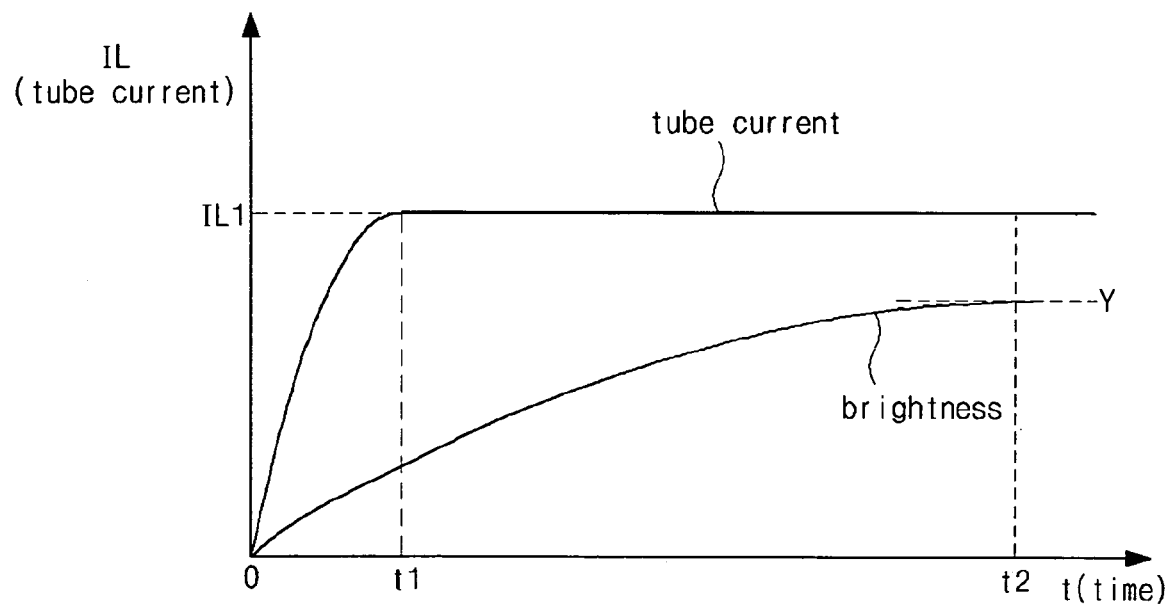
FIG. 2 illustrates tube current and brightness of light emitted by a lamp versus time in the related art lamp-driving circuit.
Figures 3, 4:
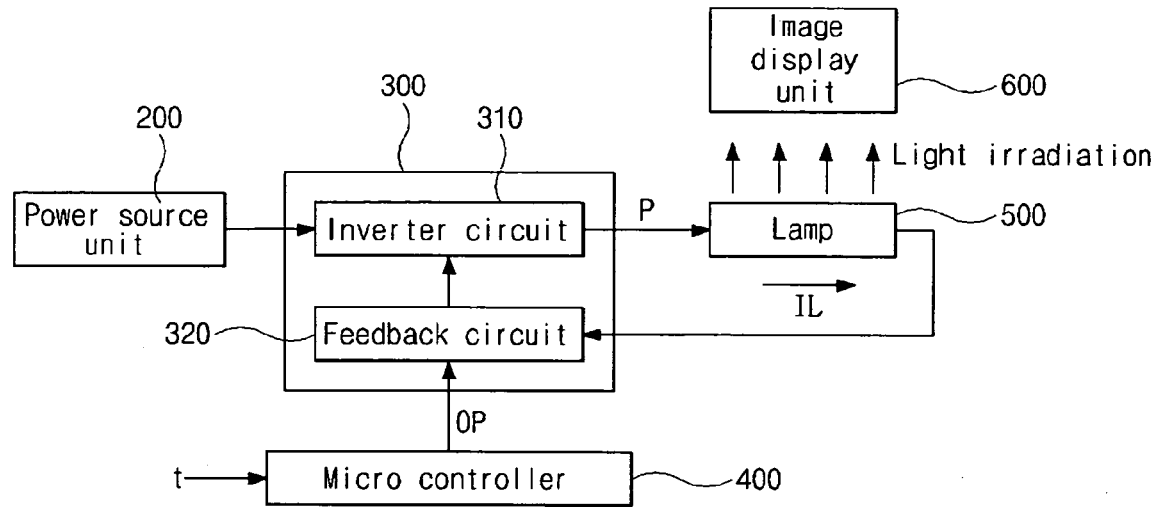
FIG. 3 illustrates a schematic view of an LCD device according to the principles of the present invention.
FIG. 4 illustrates a lookup table indicating a value of tube current reference signals as a function of input time according to principles of the present invention.

FIG. 3 illustrates a schematic view of an LCD device according to the principles of the present invention.

Referring to FIG. 3, a lamp 500 may be driven by a lamp-driving circuit to emit light to an image display unit 600 (e.g., an LCD panel). The emitted light may then be selectively transmitted by the image display unit 600 and an image may thus be expressed. The lamp 500 may, for example, be provided as a halogen cathode fluorescent lamp, a cold cathode fluorescent lamp, or the like. Though not shown, the liquid crystal panel of the image display unit 600 may, for example, include first and second substrates and a liquid crystal layer interposed between the first and second substrates. In one aspect of the present invention, the liquid crystal panel may include a plurality of pixels arranged in a matrix pattern.

According to principles of the present invention, the lamp-driving circuit may, for example, include a power source unit 200 for providing power to the lamp 500, an inverter unit 300 for altering the power output by the power source unit 200, and an inverter-controlling unit 400 (e.g., a micro-controller) for controlling an operation of the inverter unit 300.

According to principles of the present invention, the power source unit 200 may apply either AC power or DC power to the inverter unit 300 and the inverter unit 300 may alter (e.g., boost) the power output by the power source unit 200 suitable for driving the lamp 500. For example, the power source unit 200 may output a low voltage DC power and the inverter unit 300 may alter the low voltage DC power into a high voltage lamp-driving power P having an AC waveform. Accordingly, the inverter unit 300 of the present invention may, for example, include an inverter circuit 310 and a feedback circuit 320.

According to principles of the present invention, the inverter circuit 310 may, for example, include a switching element and a transformer (both not shown). In one aspect of the present invention, the switching element may selectively apply (e.g., switch) source power output by the power source unit 200 to the transformer in accordance with a control signal output by the feedback circuit 320. In another aspect of the present invention, the transformer may boost the source power switched by the switching element according to a turn ratio of a primary coil and a secondary coil. For example, an AC waveform may be supplied to the primary coil through the switching element of the inverter circuit 310 and may be boosted due to the turn ratio of the transformer to induce a high voltage AC at the secondary coil (i.e., the lamp-driving power P). The lamp-driving power P may, in turn, be output to drive the lamp 500.

In one aspect of the present invention, the feedback circuit 320 may, for example, output a control signal to the inverter circuit 310, wherein the output control signal may control a switching frequency and/or switching duty cycle of the switching element within the inverter circuit 310. By controlling the switching frequency of the switching element, a substantially constant lamp-driving power P may be output from the inverter circuit 310 to the lamp 500. In another aspect of the present invention, the feedback circuit 320 may be connected to the lamp 500 and receive tube current IL flowing within the lamp 500 and compare a tube current reference signal OP output from the inverter-controlling unit 400 (as will be discussed in greater detail below) with the received output tube current IL or with a signal corresponding to the tube current IL flowing within the lamp 500. If, based on the comparing, the tube current IL is less than a predetermined value corresponding, for example, to the output tube current reference signal OP, the feedback circuit 320 may output an appropriate control signal to the inverter circuit 310 to adjust the switching frequency and/or switching duty cycle of the switching element within the inverter circuit 310. Accordingly, the inverter circuit 310 may adjust at least one attribute of the source power output by the power source unit 200 (e.g., the period, the average voltage, the duty cycle, etc.) to adjust (e.g., increase) the source power output by the power source unit 200 and output the adjusted source power as the lamp-driving power P. If, based on the comparing, the tube current IL is equal to or greater than a predetermined value corresponding, for example, to the output tube current reference signal OP, the feedback circuit 320 may output an appropriate control signal to the inverter circuit 310 to adjust the switching frequency and/or switching duty cycle of the switching element within the inverter circuit 310. Accordingly, the inverter circuit 310 may adjust at least one attribute of the source power output by the power source unit 200 (e.g., the period, the average voltage, the duty cycle, etc.) to adjust (e.g., decrease) the source power output by the power source unit 200 and output the adjusted source power as the lamp-driving power P. In one aspect of the present invention, the lamp-driving power P output by the inverter circuit 310 may be continually supplied (e.g., without interruption) to the lamp 500 to induce a substantially uniform tube current IL within the lamp 500. When a substantially constant lamp-driving power P is output from the inverter circuit 310, a substantially uniform tube current IL having a desired value may flow within the lamp 500.

According to principles of the present invention, the inverter-controlling unit 400 may control an operation of the inverter unit 300 and, therefore, may be used to adjust the lamp-driving power P output by the inverter unit 300. In one aspect of the present invention, the inverter-controlling unit 400 may control the inverter unit 300 by outputting the aforementioned tube current reference signal OP to the feedback circuit 320. Upon receipt of the tube current reference signal OP, the feedback circuit 320 may output an appropriate control signal to the inverter circuit 310 to adjust the switching frequency of the switching element within the inverter circuit 310. As described above, the lamp-driving power P may be adjusted by adjusting the switching frequency of the switching element within the inverter circuit 310. Accordingly, the lamp-driving power P may be changed based on the tube current reference signal OP. As described above, the lamp-driving power P output by the inverter unit 300 may be continually supplied (e.g., without interruption) to the lamp 500 to induce a substantially uniform tube current IL. Accordingly, a substantially uniform tube current IL, corresponding to the tube current reference signal OP, may be maintained within the lamp 500.

According to principles of the present invention, the inverter-controlling unit 400 may, for example, additionally output a particular tube current reference signal OP in accordance with the input time, t, during which the lamp 500 is being driven. For example, the inverter-controlling unit 400 may use a lookup table to adjust the tube current reference signal OP. In one aspect of the present invention, the lookup table may comprise a plurality of values for the tube current reference signals OP as a function of input time, t. In one aspect of the present invention, the lookup table may be stored on a storing means included within the inverter-controlling unit 400. The storing means may, for example, include a non-volatile memory such as a read only memory (ROM) or the like, or a volatile memory such as a random access memory (RAM), or the like.

FIG. 4 illustrates a lookup table indicating tube current reference signals as a function of input time according to principles of the present invention.

Referring to FIG. 4, when $t_j \leq t < t_i$, a tube current reference signal OPj may be output from the inverter-controlling unit 400 to the feedback circuit 320. Upon receipt of the tube current reference signal OPj, the feedback circuit 320 may output a control signal to the inverter circuit 310 to adjust the source power output by the power source unit 200 as a lamp-driving power P sufficient to induce a tube current IL within the lamp 500 that has a value corresponding to a value of the output tube current reference signal OPj. After a predetermined amount of time passes, e.g., when $t_c \leq t$, a tube current reference signal OPc may be continually output and a substantially constant tube current IL may flow within the lamp 500.

Having described the backlight unit driving circuit in accordance with the principles of the present invention, a method of driving a lamp of an LCD device will now be described in greater detail.

Figure 5:
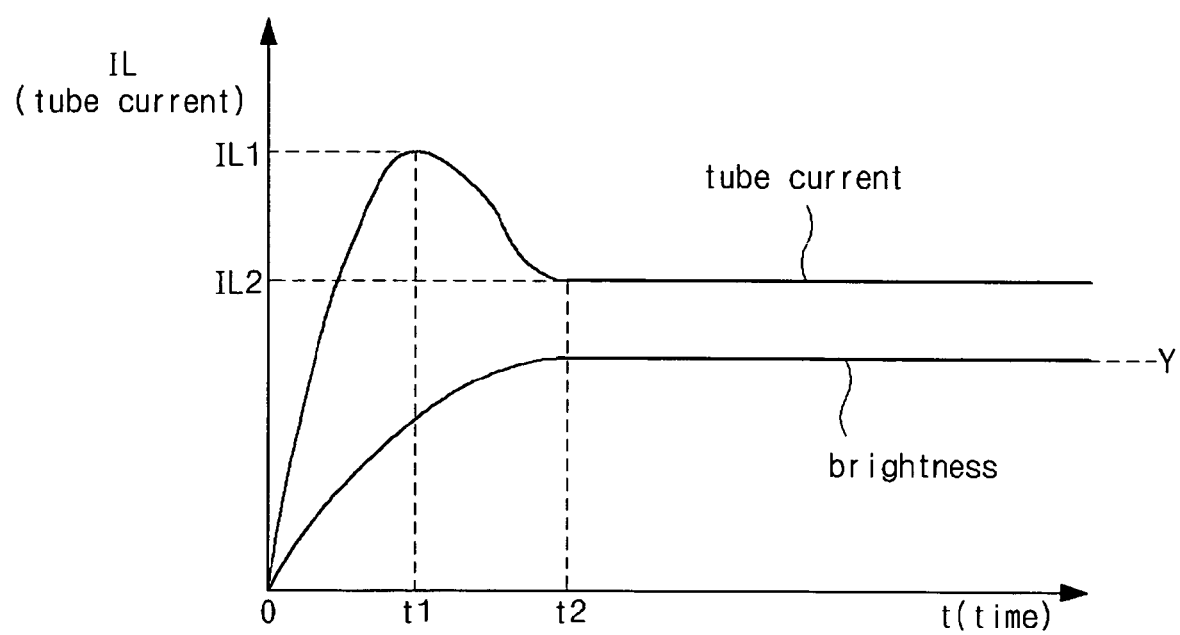
FIG. 5 illustrates tube current and brightness of light emitted by a lamp versus time in accordance with the principles of the present invention.

FIG. 5 illustrates tube current and brightness of light emitted by a lamp versus time in accordance with the principles of the present invention Referring generally to FIG. 5, the tube current IL quickly increases as the input time, t, progresses until, at the end of a first time period, t1, the tube current IL reaches a first tube current value, IL1, (e.g., abut 9 mA). As the input time, t, further progress beyond the end of the first time period, t1, the value of tube current IL decreases until, at the end of a second time period, t2, the tube current is maintained at a second (i.e., normal) tube current value, IL2, (e.g., about 6 mA). In one aspect of the present invention, the end of the second time period t2 may be within about one minute of initially driving the lamp 500. Accordingly, the inverter-controlling unit 400 may output a particular tube current reference signal OP corresponding to the particular amount of elapsed input time, t, to affect a change in the tube current IL from, for example, 0 to IL1 to IL2.

For example, the inverter-controlling unit 400 may receive an input time signal t<t1 and, using the lookup table, may output a first tube current reference signal OP1 having a particular value corresponding to the input time signal t<t1. The feedback circuit 320 may control the switching of the switching element of the inverter circuit 310 to adjust the switching frequency and/or the switching duty cycle of the inverter circuit 310 in accordance with the particular value of the first tube current reference signal OP1. Accordingly, the inverter circuit 310 may adjust at least one attribute of the source power output by the power source unit 200 (e.g., the period, the average voltage, the duty cycle, etc.) in a manner corresponding to the particular value of the first tube current reference signal OP1 and output the adjusted source power as the lamp-driving power P to the lamp 500 to increase the tube current IL to the first tube current value, IL1. Because the tube current IL increases to IL1 upon initially driving the lamp 500, the brightness of light emitted from the lamp 500 increases more rapidly as compared with the brightness of light emitted from the lamp discussed with respect to the related art.

Next, as the input time, t, progresses from t1 to t2, the value of the tube current IL flowing through the lamp 500 decreases from IL1 to IL2. When the tube current IL attains the second tube current value, IL2, the brightness of light emitted by the lamp 500 has a value of Y, which is normal brightness suitable for displaying normal images by the image display unit 600. To reduce the tube current from IL1 to IL2, the inverter-controlling unit 400 may use the lookup table to output a second tube current reference signal OP2, different from the first tube current reference signal OP1, having a particular value corresponding to the input time signal t=t2. The feedback circuit 320 may control the switching of the switching element of the inverter circuit 310 to adjust the switching frequency and/or the switching duty cycle of the inverter circuit 310 in accordance with the particular value of the second tube current reference signal OP2. Accordingly, the inverter circuit 310 may adjust at least one attribute of the source power output by the power source unit 200 (e.g., the period, the average voltage, the duty cycle, etc.) in a manner corresponding to the particular value of the second tube current reference signal OP2 and output the adjusted source power as the lamp-driving power P to the lamp 500 to decrease the tube current IL from the value of IL1 to IL2.

Next, as the input time, t, progresses beyond the end of the second time period, t2, the inverter-controlling unit 400 may continue to output the second tube current reference signal OP2, ensuring that the second tube current value IL2 flowing within the lamp 500 is substantially maintained. Because the light emitted by the lamp 500 is of the normal brightness Y when t=t2, the tube current IL flowing in the lamp 500 is substantially maintained at the value of IL2.

As described above, the inverter-controlling unit 400 controls the tube current IL using, at least in part, a lookup table containing a plurality of values for the tube current reference signals as a function of input time. The principles of the present invention, however, may also be extended to a plurality of other systems. For example, a brightness of light emitted by the lamp 500 may be determined by a brightness detecting system; a corresponding brightness signal may be generated; and the inverter-controlling unit 400, connected to the brightness detecting system, may control the tube current IL using, at least in part, a lookup table containing a plurality of values for the tube current reference signals as a function of brightness values.

According to principles of the present invention, when the lamp is initially driven, the inverter-controlling unit 400 may control the tube current flowing within the lamp to be greater than the tube current flowing through the lamp discussed with respect to the related art. Thus, the amount of time required to emit light at the normal brightness value may be reduced. Further, because a tube current having a substantially constant value corresponding to the normal brightness value may be applied throughout operation of the lamp, the lamp may emit light at a substantially constant brightness level.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of driving a lamp, comprising:
   receiving a source power output from a power source;
   generating a first control signal;
   adjusting at least one attribute of the received source power based on the first control signal to generate a first lamp-driving power, the first lamp-driving power inducing a first tube current having a first tube current value within the lamp;
   after generating the first control signal, generating a second control signal, different from the first control signal; and
   adjusting at least one attribute of the received source power based on the second control signal to generate a second lamp-driving power, the second lamp-driving power inducing a second tube current having a second tube current value within the lamp, wherein the second tube current value is different from the first tube current value.

2. The method of claim 1, wherein the first tube current value is greater than the second tube current value.

3. The method of claim 1, wherein the second tube current value is greater than the first tube current value.

4. The method of claim 1, wherein the first tube current value is about 9 mA.

5. The method of claim 1, wherein the first tube current value is about 6 mA.

6. The method of claim 1, wherein generating the first control signal includes:
   determining an amount of time during which the source power has been received; and
   generating a first tube current reference signal based on the determining.

7. The method of claim 6, further comprising:
   outputting the first tube current from the lamp;
   comparing the first tube current value output of the output first tube with a value of the first tube current reference signal;
   generating the second control signal based on the comparing.

8. The method of claim 1, wherein generating the first control signal includes:
   detecting a brightness of light emitted by the lamp; and
   generating a first tube current reference signal based on the detecting.

9. The method of claim 1, wherein generating the second control signal includes:
   determining an amount of time during which the source power has been received; and
   generating a second tube current reference signal based on the determining.

10. The method of claim 9, further comprising generating the second tube current reference signal within about one minute after receiving the source power output.

11. The method of claim 1, wherein generating the second control signal includes:
    detecting a brightness of light emitted by the lamp; and
    generating a second tube current reference signal based on the detecting.

12. The method of claim 1, wherein adjusting at least one attribute of the received source power based on the first control signal includes adjusting at least one of a period, average voltage, and duty cycle of the source power.

13. The method of claim 1, wherein adjusting at least one attribute of the received source power based on the second control signal includes adjusting at least one of a period, average voltage, and duty cycle of the source power.

14. A liquid crystal display device, comprising:
    an image display unit;
    a lamp that emits light to the image display unit;
    a power source unit that provides power to the lamp;
    an inverter unit connected to an output of the power source unit and the lamp, the inverter unit altering power output by the power source unit and outputting the altered power to the lamp,
    wherein the inverter unit includes:
    an inverter circuit connected between the power source unit and the lamp, the inverter circuit having a switching element and a transformer that alters power output by the power source unit and outputs the altered power to the lamp; and
    a feedback circuit connected to the inverter-controlling unit and the inverter circuit that generates a control signal to control a switching operation of the switching element; and
    an inverter-controlling unit connected to the inverter unit, the inverter-controlling unit generates at least two reference signals that at least partially control the altering operation of the inverter unit.

15. The liquid crystal display device of claim 14, wherein the control signal controls at least one of a switching frequency and a switching duty cycle of the switching element.

16. The liquid crystal display device of claim 14, wherein the feedback circuit is connected to an output of the lamp and compares a value of a current flowing through the lamp with a value of the reference signal to generate the control signal.

17. The liquid crystal display device of claim 14, wherein the inverter-controlling unit includes a lookup table containing a plurality of values of reference signals as a function of time during which power is provided to the lamp.

18. The liquid crystal display device of claim 14, further comprising a brightness detecting unit that detects a brightness of light emitted by the lamp.

19. The liquid crystal display device of claim 18, wherein:
    the brightness detecting unit is connected to the inverter-controlling unit; and
    wherein the inverter-controlling unit includes a lookup table containing a plurality of values of reference signals as a function of brightness of light emitted by the lamp.

20. The liquid crystal display device of claim 14, wherein the at least two reference signals includes:
    a first reference signal at least partially controlling the altering operation of the inverter unit to output an altered power having a first current value; and
    a second reference signal at least partially controlling the altering operation of the inverter unit to output an altered power having a second current value, wherein the second current value is less than the first current value.

* * * * *